A. REASON.
THRESHING MACHINE.
APPLICATION FILED OCT. 12, 1915.

1,184,999. Patented May 30, 1916.

INVENTOR
Albert Reason
BY Raymond A. Parker
ATTORNEY

UNITED STATES PATENT OFFICE.

ALBERT REASON, OF VANCOUVER, BRITISH COLUMBIA, CANADA.

THRESHING-MACHINE.

1,184,999. Specification of Letters Patent. Patented May 30, 1916.

Application filed October 12, 1915. Serial No. 55,554.

*To all whom it may concern:*

Be it known that I, ALBERT REASON, a citizen of the United States, residing at Vancouver, Province of British Columbia, Canada, have invented a certain new and useful Improvement in Threshing-Machines, and declare the following to be a full, clear, and exact description of the same, such as will enable others skilled in the art to which it pertains to make and use the same, reference being had to the accompanying drawings, which form a part of this specification.

This invention relates to threshing machines and comprises a threshing machine structure in which fans are located on opposite ends of the rotating shaft which carries the revolving skeleton structure which does the main part of the threshing.

The advantages and the new results can best be explained after the structure is understood in detail.

Figure 1:
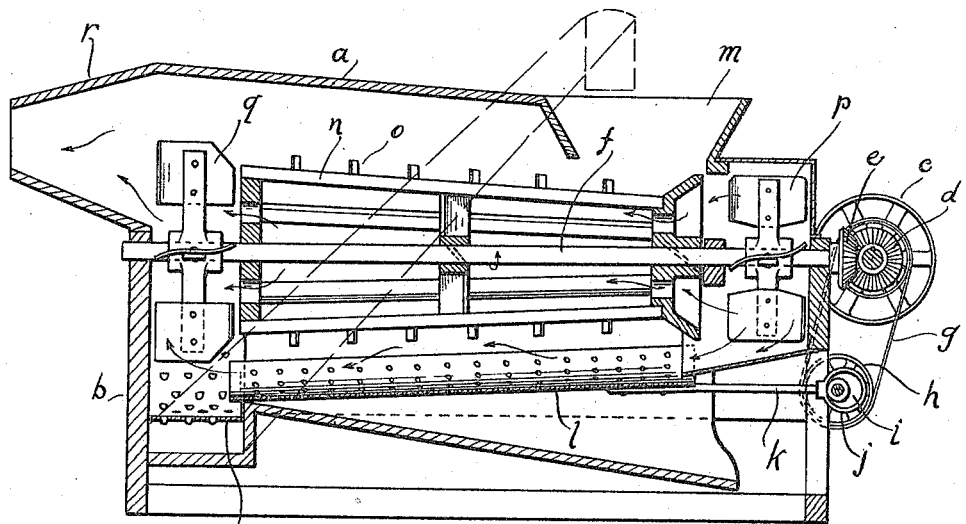
Figure 2:
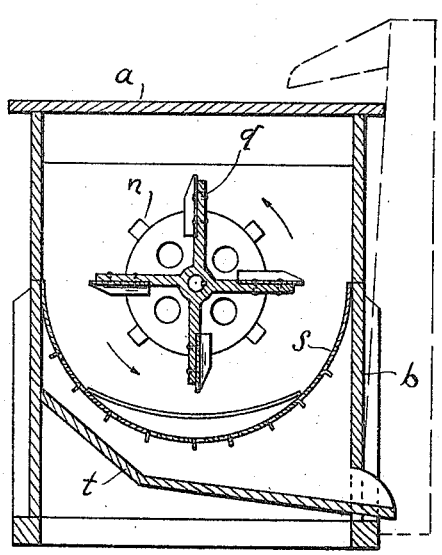
Figure 3:
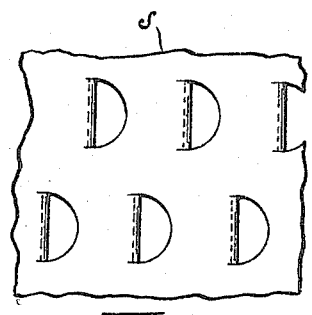
Figure 4:

In the drawings,—Figure 1 is a vertical longitudinal section of the machine. Fig. 2 is a vertical cross section. Fig. 3 is a plan view, fragmentary in character, of the perforated plate under the tail fan. Fig. 4 is a fragmentary section of the same member.

Upper and lower housings $a$ and $b$ form the inclosure of the parts. On the outside of the machine is a pulley wheel $c$ provided with a bevel gear $d$ which meshes with the driven bevel gear $e$ attached to the rotating shaft $f$. The shaft $f$ is the horizontal shaft of the machine which extends longitudinally through the interior of the inclosure. A belt $g$ runs over the pulley wheel $c$ and over an adjacent pulley wheel $h$ properly journaled on the outside of the lower housing. This pulley wheel $h$ drives the eccentric $i$ which revolves in the eccentric strap $j$ to reciprocate the rod $k$. The rod $k$ serves to continually shake the screen $l$ on the interior of the housings.

The grain on the stalks is introduced through the spout $m$ and comes in contact with the conical skeleton $n$ provided with a spirally arranged blade $o$. This skeleton, revolving six or eight hundred revolutions per minute, serves to do the major portion of the threshing or beating all the grain from the straw. The spiral arrangement of the blades feeds the straw screw fashion from the front to the tail of the machine.

The front fan $p$ fast to the shaft $f$ serves to generate an air current through the skeleton $n$ and over the sieve $l$ to aid in separating the berries of grain from the straw, and separating the chaff from the berries that fall on the sieve $l$. This much of the construction is old and is substantially shown in my Patent #990,007 of April 18, 1911. However, in my previous patent the fan blades at the front of the skeleton were attached to the forward end of the skeleton and were not adapted to send a current of air across the screen but only through the center of the skeleton.

My improvement comprises the utilization of separate fans on the ends of the shaft which carries the skeleton. The forward fan $p$ has large blades which are not only adapted to send currents of air through the skeleton as in my previous patent, but also adapted to send a current of air across the vibratory screen $l$. This is a distinct improvement as it does away with the necessity of an additional fan which was rendered necessary in the old structure to winnow the grain lying on the screen. The tail fan $q$ serves not only to augment the air current to blow the chaff out the tail spout $r$ but it also acts in conjunction with the skeleton to finish the threshing operation and to finish lifting and forcing the straw screw fashion toward the tail of the machine and out the spout $r$. When the straw is taken from the rear end of the skeleton cylinder, it will ordinarily be forced once around by the fan before it is lifted and delivered to the spout $r$. The perforated segmental plate $s$ serves to allow the passage of any residue of grain which may be left in the straw into a return chute $t$ so that this grain, which is ordinarily wasted in most threshing machines, is saved. The perforations in the plate $s$ are made by striking down half circles $s$, which is a convenient way of perforating a plate and at the same time avoids too much air going through into the chute $t$.

It is to be understood that the air from the front fan blown across the screen runs also into the segmental plate and into the larger tail fan. The tail fan also sets up a strong current of air that blows across the segmental plate to winnow the grain and is finally discharged out the spout $r$ to blow the accumulated chaff on the perforated plate out with the straw as it is forced through the spout by the screw action of the apparatus.

What I claim is:

1. In a threshing machine, a housing, a shaft journaled lengthwise, a skeleton member secured to the shaft for beating the straw and forcing the same to the tail of the machine, a fan located on the front end of the shaft, and a tail fan located on the rear end of the shaft, the latter adapted to both aid in the winnowing of the grain and to finish the threshing operation of the skeleton.

2. In a threshing machine, a housing, a shaft journaled in the same and disposed longitudinally thereof, a threshing frame secured to the mid portion of the shaft, a vibratory screen below the threshing frame, a fan secured to the front end of the shaft and arranged to deliver air currents over the screen, a fan secured to the rear end of the shaft and arranged to winnow the grain and also complete the threshing operation, a perforated plate thereunder, and a receptacle under the perforated plate.

3. In a threshing machine, the combination of a housing, a revoluble threshing frame located therein, a vibratory screen located under the threshing frame, a fan located at the forward end of the threshing frame for blowing air therethrough and over the screen, and a tail fan located at the rear end of the threshing frame and arranged to complete the threshing operation and further winnow the grain.

In testimony whereof, I sign this specification.

ALBERT REASON.

Copies of this patent may be obtained for five cents each, by addressing the "Commissioner of Patents, Washington, D. C."